US010903737B2

(12) United States Patent
Takeda et al.

(10) Patent No.: US 10,903,737 B2
(45) Date of Patent: Jan. 26, 2021

(54) POWER SUPPLY CIRCUIT FOR GENERATING A PREDETERMINED VOLTAGE AND A PREDETERMINED CURRENT

(71) Applicant: PANASONIC INTELLECTUAL PROPERTY MANAGEMENT CO., LTD., Osaka (JP)

(72) Inventors: Noriaki Takeda, Osaka (JP); Taiki Nishimoto, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/608,695

(22) PCT Filed: Apr. 26, 2018

(86) PCT No.: PCT/JP2018/016970
§ 371 (c)(1),
(2) Date: Oct. 25, 2019

(87) PCT Pub. No.: WO2018/199228
PCT Pub. Date: Nov. 1, 2018

(65) Prior Publication Data
US 2020/0144905 A1    May 7, 2020

(30) Foreign Application Priority Data
Apr. 28, 2017   (JP) .................................. 2017-090153

(51) Int. Cl.
*H02M 1/42*   (2007.01)
*H02M 1/14*   (2006.01)
(Continued)

(52) U.S. Cl.
CPC ........... *H02M 1/4208* (2013.01); *H02M 1/14* (2013.01); *H02M 3/158* (2013.01); *H02M 2001/0009* (2013.01)

(58) Field of Classification Search
CPC ................. H02M 1/14; H02M 1/4208; H02M 2001/0009; H02M 2001/0064;
(Continued)

(56) References Cited

U.S. PATENT DOCUMENTS 6,084,790 A * 7/2000 Wong ................... H02M 3/1584
323/272
7,151,364 B2 * 12/2006 Kimura ............... H02M 3/1584
323/282
(Continued)

FOREIGN PATENT DOCUMENTS

JP        2007-195282 A      8/2007
JP        WO2018199223 A1 *  4/2018

OTHER PUBLICATIONS

International Search Report and Written Opinion issued in International Patent Application No. PCT/JP2018/016970, dated Jun. 26, 2018; with partial English translation.

*Primary Examiner* — Thienvu V Tran
*Assistant Examiner* — Sisay G Tiku
(74) *Attorney, Agent, or Firm* — McDermott Will and Emery LLP

(57) ABSTRACT

Provided is a power circuit in which a first input terminal is connected to a first end of a second inductor, a second end of the second inductor is connected to a first end of a first reactor, the second end of the second inductor is connected to a first end of a second reactor, the first input terminal is connected to a first end of a first inductor, a second end of
(Continued)

the first inductor is connected to a first end of a bypass capacitor, a second end of the bypass capacitor is connected to a second output terminal, the first inductor and the second inductor are magnetically coupled to each other, and a control circuit performs switching control over first and second switching elements, using an interleaving method.

5 Claims, 13 Drawing Sheets

(51) Int. Cl.
*H02M 3/158* (2006.01)
*H02M 1/00* (2006.01)

(58) Field of Classification Search
CPC .. H02M 1/4225; H02M 3/158; H02M 3/1584; H02M 2003/1586; H02M 7/12

See application file for complete search history.

(56) References Cited

U.S. PATENT DOCUMENTS

| | | | | |
|---|---|---|---|---|
| 7,602,165 | B2* | 10/2009 | Watanabe | H02M 3/1584 |
| | | | | 323/272 |
| 8,513,932 | B2* | 8/2013 | Yang | H02M 3/1584 |
| | | | | 323/282 |
| 9,912,229 | B2* | 3/2018 | Choudhury | H02M 1/4208 |
| 2005/0226015 | A1* | 10/2005 | Tsuruya | H02M 1/4225 |
| | | | | 363/89 |
| 2007/0076343 | A1* | 4/2007 | Terada | H03H 7/0107 |
| | | | | 361/111 |
| 2007/0262752 | A1* | 11/2007 | Gaikwad | G05F 1/70 |
| | | | | 323/207 |
| 2011/0188273 | A1* | 8/2011 | Pansier | H02M 1/4225 |
| | | | | 363/44 |
| 2012/0039094 | A1* | 2/2012 | Shin | H02M 1/4225 |
| | | | | 363/21.04 |
| 2016/0315552 | A1* | 10/2016 | Nishimoto | H02M 1/126 |
| 2016/0373001 | A1* | 12/2016 | Liu | H02M 3/158 |
| 2019/0173385 | A1* | 6/2019 | Park | H02M 3/1584 |
| 2019/0348918 | A1* | 11/2019 | Ojika | H02M 1/14 |
| 2020/0144905 | A1* | 5/2020 | Takeda | H02M 1/4208 |

* cited by examiner

US 10,903,737 B2

POWER SUPPLY CIRCUIT FOR GENERATING A PREDETERMINED VOLTAGE AND A PREDETERMINED CURRENT

CROSS-REFERENCE OF RELATED APPLICATIONS

This application is the U.S. National Phase under 35 U.S.C. § 371 of International Patent Application No. PCT/JP2018/016970, filed on Apr. 26, 2018, which in turn claims the benefit of Japanese Application No. 2017-090153, filed on Apr. 28, 2017, the entire disclosures of which Applications are incorporated by reference herein.

TECHNICAL FIELD

The present disclosure relates to a power circuit that generates a predetermined voltage and a predetermined current.

BACKGROUND ART

Patent Literature 1 discloses a power supply device that reduces ripple components constituting a noise, by performing switching control using an interleaving method.

In the conventional technique, there is a demand to further reduce noises with frequencies equal to an even multiple of a switching frequency.

CITATION LIST

Patent Literature

Patent Literature 1: JP 2007-195282 A

SUMMARY OF INVENTION

A power circuit according to one aspect of the present disclosure includes a first input terminal (3a); a second input terminal (3b); a first reactor (Lr1); a second reactor (Lr2); a first switching element (Sw1); a second switching element (Sw2); a third switching element (S1); a fourth switching element (S2); a first capacitor (C1); a first output terminal (5a); a second output terminal (5b); a control circuit (9); a first inductor (Lc1); a second inductor (Lp1); and a bypass capacitor (Cb1). In the power circuit, the first input terminal (3a) is connected to a first end of the second inductor (Lp1), a second end of the second inductor (Lp1) is connected to a first end of the first reactor (Lr1), a second end of the first reactor (Lr1) is connected to a first end of the third switching element (S1), and a second end of the third switching element (S1) is connected to the first output terminal (5a), the second end of the second inductor (Lp1) is connected to a first end of the second reactor (Lr2), a second end of the second reactor (Lr2) is connected to a first end of the fourth switching element (S2), and a second end of the fourth switching element (S2) is connected to the first output terminal (5a), the second input terminal (3b) is connected to the second output terminal (5b), a first end of the first switching element (Sw1) is connected to the second end of the first reactor (Lr1), and a second end of the first switching element (Sw1) is connected to the second output terminal (5b), a first end of the second switching element (Sw2) is connected to the second end of the second reactor (Lr2), and a second end of the second switching element (Sw2) is connected to the second output terminal (5b), a first end of the first capacitor (C1) is connected to the first output terminal (5a), and a second end of the first capacitor (C1) is connected to the second output terminal (5b), the first input terminal (3a) is connected to a first end of the first inductor (Lc1), a second end of the first inductor (Lc1) is connected to a first end of the bypass capacitor (CH), and a second end of the bypass capacitor (CH) is connected to the second output terminal (5b), the first inductor (Lc1) and the second inductor (Lp1) are magnetically coupled to each other, and the control circuit (9) performs switching control over the first switching element (Sw1) and the second switching element (Sw2), using an interleaving method.

According to the present disclosure, noises with frequencies equal to an even multiple of a switching frequency can be further reduced.

DESCRIPTION OF EMBODIMENTS

Knowledge Underlying the Present Disclosure

Figure 6:
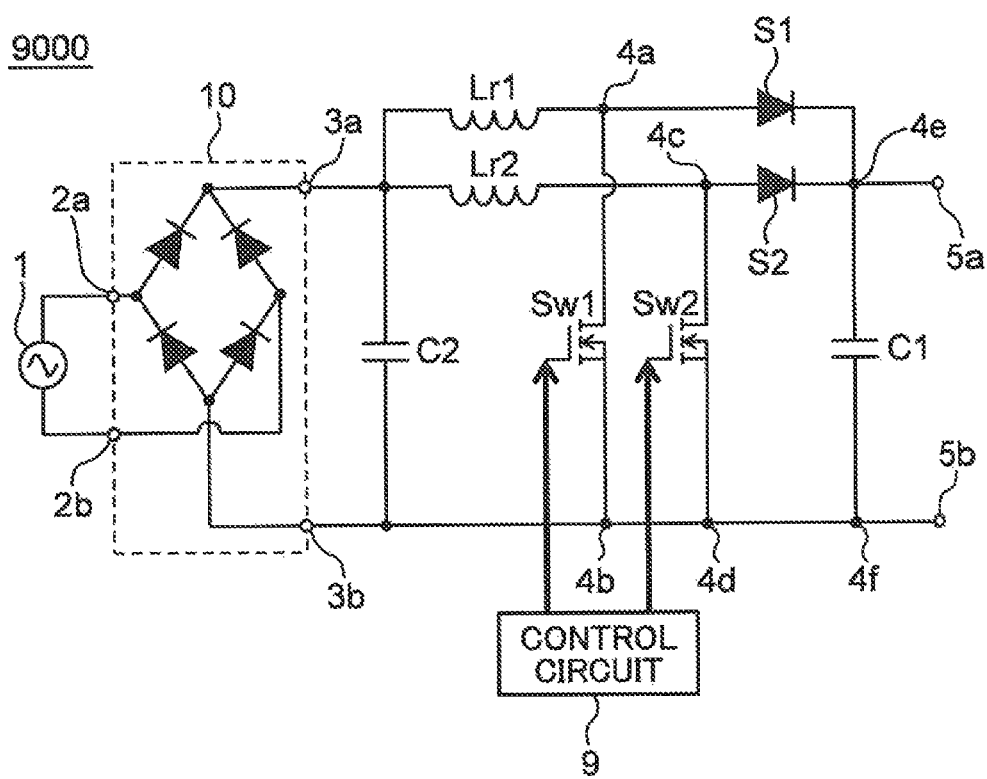
FIG. 6 is a circuit diagram showing a schematic configuration of a power factor improving circuit of a comparative example which performs switching control using an interleaving method.

Knowledge underlying the present disclosure will first be described. FIG. 6 is a circuit diagram showing a schematic configuration of a power factor improving circuit 9000 of a comparative example which performs switching control using an interleaving method. The power factor improving circuit 9000 shown FIG. 6 that performs switching control, using the interleaving method, similarly to the power supply device disclosed in Patent Literature 1 has been conventionally known.

Specifically, in the power factor improving circuit 9000, an AC voltage from an AC power supply 1 is applied across a first input end 2a and a second input end 2b of a rectifying section 10. The applied AC voltage is rectified by the rectifying section 10 into a DC voltage, which is then applied across a first input terminal 3a and a second input terminal 3b.

A first switching element Sw1 and a second switching element Sw2 are subjected to switching control by a control circuit 9 using the interleaving method. Specifically, under such switching control, the first switching element Sw1 and the second switching element Sw2 are switched on and off at the same switching frequency (which will hereinafter be referred to as switching frequency fsw) such that the first switching element Sw1 and the second switching element Sw2 are different in phase by 180 degrees from each other.

A third switching element S1 is switched off when the first switching element Sw1 is switched on, and is switched on when the first switching element Sw1 is switched off. Likewise, a fourth switching element S2 is switched off when the second switching element Sw2 is switched on, and is switched on when the second switching element Sw2 is switched off. Hereinafter, operations of the first and second switching elements Sw1 and Sw2 under the switching control by the control circuit 9 using the interleaving method will be referred to as interleaving operations.

When the first switching element Sw1 is on, current energy is accumulated at a first reactor Lr1. When the third switching element S1 is on, current energy is transferred from the first reactor Lr1 to a first capacitor C1. When the second switching element Sw2 is on, current energy is accumulated at a second reactor Lr2. When the fourth switching element S2 is on, current energy is transferred from the second reactor Lr2 to the first capacitor C1. As a result of these actions, a DC voltage develops between a first output terminal 5a and a second output terminal 5b of the power factor improving circuit 9000.

The first reactor Lr1 and the second reactor Lr2 accumulate and release current energy repeatedly. As a result, currents flowing through the first reactor Lr1 and the second reactor Lr2 take waveforms having large triangular-wave-shaped ripples. These triangular-wave-shaped ripples propagate as a noise to, for example, the AC power supply 1 or the like.

Based on its propagation characteristics, a noise is classified into a normal mode noise and a common mode noise. A normal mode noise is a noise that circulates through a power line loop. A common mode noise is a noise that propagates through a plurality of power lines at the same phase and returns to the power supply by propagating through a neutral line at the phase reverse to the same phase. Triangular-wave-shaped ripples propagate as a normal mode noise.

Figure 7:
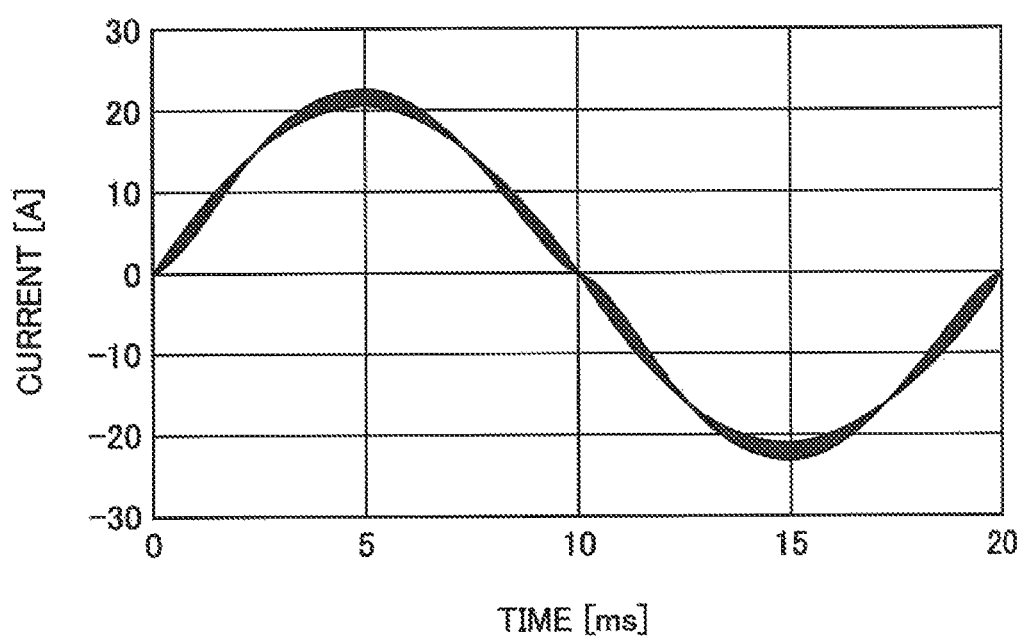
FIG. 7 is a graph showing a calculation result obtained by a circuit simulation of a power current in the power factor improving circuit shown in FIG. 6.

FIG. 7 is a graph showing a calculation result obtained by a circuit simulation of a power current in the power factor improving circuit 9000. A segment of a power current waveform shown in FIG. 7, the segment in a period from time 5 ms to time 5.1 ms, is extracted and is shown in an enlarged form in FIG. 8.

In the circuit simulation, the inductance of the first reactor Lr1 and of the second reactor Lr2 is determined to be 200 uH. The capacitance of an X-capacitor C2 is determined to be 400 nF. The switching frequency fsw is determined to be 100 kHz. The frequency and the effective value of the AC voltage supplied from the AC power supply 1 are determined to be 50 Hz and 200 V, respectively. The DC voltage that develops between the first output terminal 5a and the second output terminal 5b is determined to be 400 V.

Figure 8:
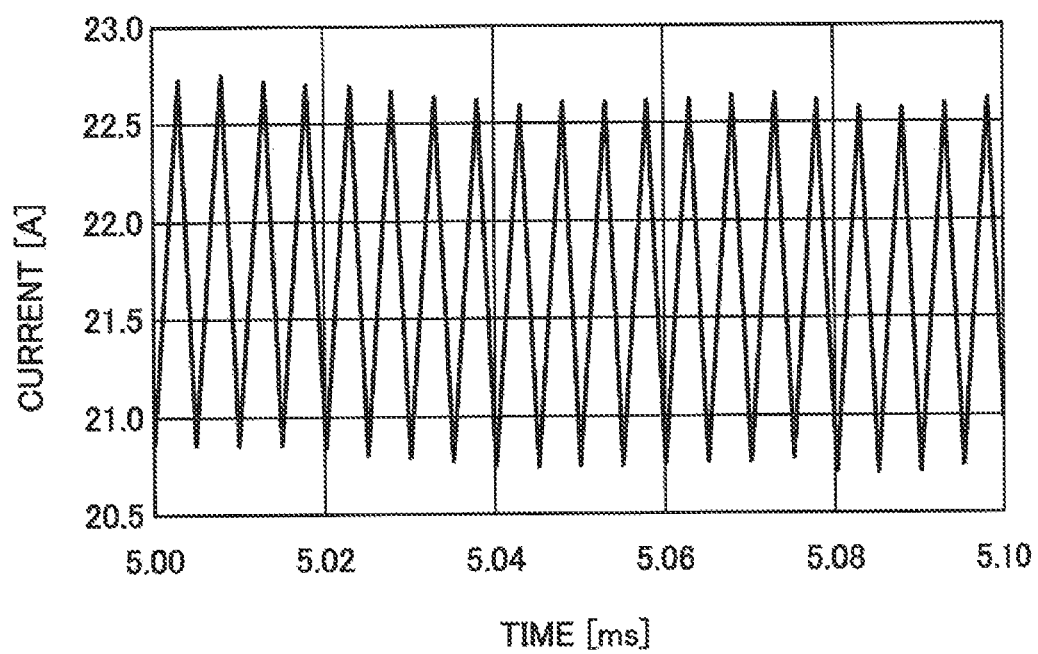
FIG. 8 is a graph showing an enlarged view of a segment of a power current waveform shown in FIG. 7, the segment being in a specific period.

According to the power factor improving circuit 9000, out of frequency components included in the generated triangle-wave-shaped ripples, frequency components equal to odd multiples of (one time, three times, . . . ) the switching frequency fsw are canceled out by interleaving operations. According to the power factor improving circuit 9000, however, frequency components equal to even multiples of (two times, four times, . . . ) the switching frequency fsw are not canceled out. As a result, as shown in FIGS. 7 and 8, the power current has a waveform of a sine wave having noises superimposed thereon.

To suppress a noise propagating to the power supply, a noise filter circuit may be provided between the power supply 1 and the rectifying section 10. This, however, raises a concern that the size of the power factor improving circuit 9000 may increase. Due to circuit layout requirements, the noise filter circuit may be mounted on a board separated from the power factor improving circuit 9000. This may raise a concern that a physical range in which a normal mode noise propagates becomes larger. As a result, a noise may enter a detection circuit used for circuit control, posing a high risk of causing circuit malfunctioning. Another problem may arise in a case where a normal mode noise is transformed into a common mode noise in a noise propagation path. In this case, the noise propagation path becomes complicated, leading to difficulty in carrying out noise preventing measures.

Another problem may arise in a case where a normal mode noise is transformed into a common mode noise in a noise propagation path. In this case, the noise propagation path becomes complicated, leading to difficulty in carrying out noise preventing measures.

Figure 9:
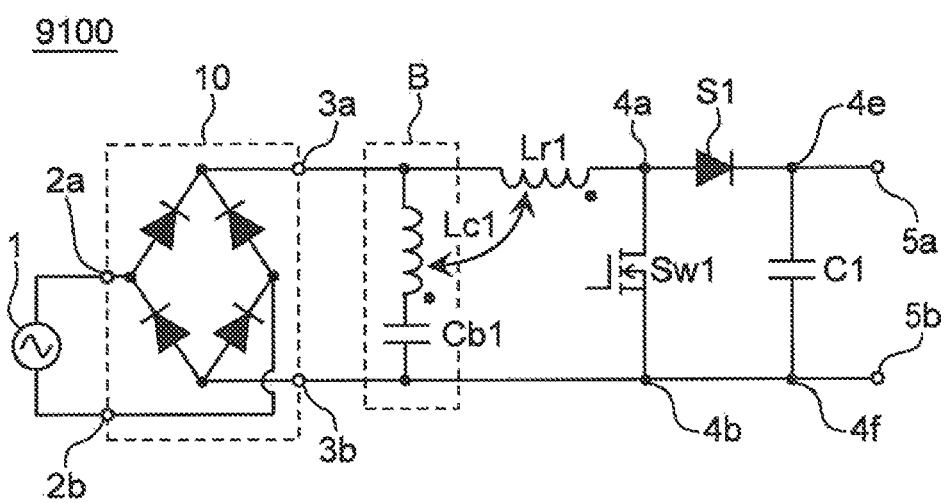
FIG. 9 is a circuit diagram showing a schematic configuration of a power factor improving circuit provided as another comparative example different from the power factor improving circuit shown in FIG. 6.
Figure 10:
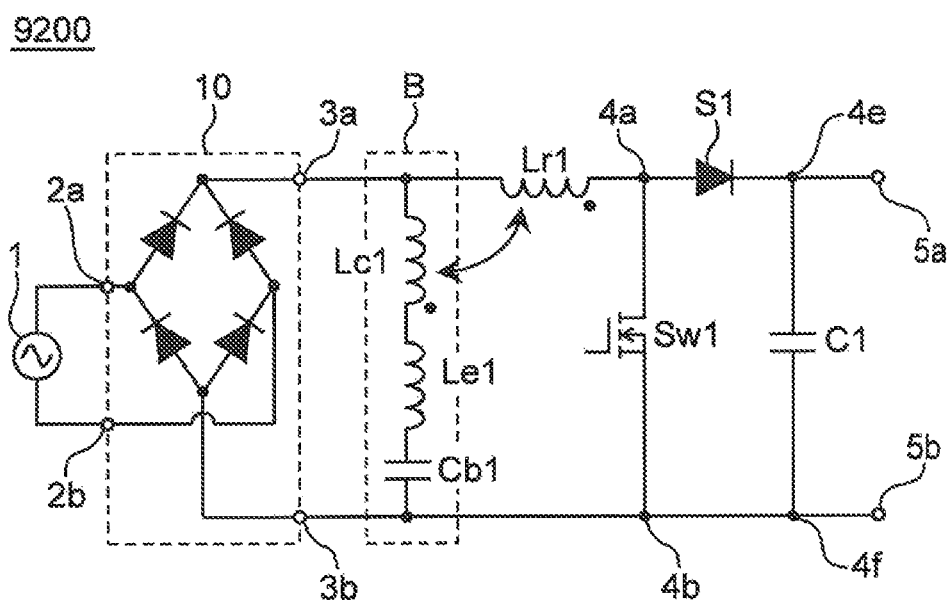
FIG. 10 is a circuit diagram showing a schematic configuration of a power factor improving circuit provided as still another comparative example different from the power factor improving circuits shown in FIGS. 6 and 9.

Meanwhile, power factor improving circuits 9100 and 9200 have been known as conventional power factor improving circuits that do not perform switching control using the interleaving method but reduce a normal mode noise with a frequency equal to the switching frequency fsw by a bypass circuit B, as shown in FIGS. 9 and 10. FIG. 9 is a circuit diagram showing a schematic configuration of the power factor improving circuit 9100 provided as another comparative example different from the power factor improving circuit 9000 shown in FIG. 6. FIG. 10 is a circuit diagram showing a schematic configuration of the power factor improving circuit 9200 provided as still another comparative example different from the power factor improving circuits 9000 and 9100 shown in FIGS. 6 and 9.

Specifically, as shown in FIGS. 9 and 10, the power factor improving circuits 9100 and 9200 each include the bypass circuit B having both ends connected respectively to the first input terminal 3a and the second input terminal 3b. The bypass circuit B has a first inductor Lc1 magnetically coupled to the first reactor Lr1, and a bypass capacitor Cb1 connected in series to the first inductor Lc1. The bypass circuit B included in the power factor improving circuit 9200 (FIG. 10) has a bypass inductor Le1 disposed between the first inductor Lc1 and the bypass capacitor Cb1.

In the power factor improving circuits 9100 and 9200, because the first reactor Lr1 and the first inductor Lc1 are magnetically coupled to each other, a current flowing through the first reactor Lr1 excites a voltage across both terminals of the bypass capacitor Cb1, causing the voltage to oscillate. Hence part of a ripple component included in the current flowing through the first reactor Lr1 is supplied from the bypass circuit B.

As a result, part of a ripple component included in a current flowing through at least one of the first reactor Lr1, the first switching element Sw1, and the third switching element S1 is canceled out by a ripple component included in a current supplied from the bypass circuit B. In this manner, the power factor improving circuits 9100 and 9200 reduce the above triangular-wave-shaped ripples flowing out toward the AC power supply 1 as a normal mode noise.

The frequency of a ripple component to be canceled out can be adjusted properly depending on constants of electrical elements included in the bypass circuit B. For example, a case is assumed where a ripple component with a frequency equal to the switching frequency fsw of the first switching element Sw1 is canceled out. In this case, a current flowing through the bypass capacitor Cb1, the current having a frequency equal to the switching frequency fsw, needs to match a current flowing through the first reactor Lr1, the current having a frequency equal to the switching frequency fsw. Specifically, the following formula (2) needs to be satisfied.

[Mathematical Formula 1]

$$f_{sw} = \frac{1}{2\pi\sqrt{C_b(L_c + L_e - k\sqrt{L_r L_c})}} \quad (2)$$

In the formula (2), the left side expresses the frequency of the ripple component to be canceled out. In this specific example, the frequency of the ripple component to be canceled out is the switching frequency fsw. Cb denotes the capacitance of the bypass capacitor Cb1. Lr denotes the inductance of the first reactor Lr1. Lc denotes the inductance of the first inductor Lc1. Le denotes the inductance of the bypass inductor Le1. The power factor improving circuit 9100 does not include the bypass inductor Le1. Therefore, when the bypass circuit B of the power factor improving circuit 9100 is configured, Le=0 in the formula (2). Also, k denotes a coupling factor for the magnetic coupling between the first reactor Lr1 and the first inductor Lc1.

As described above, according to the power factor improving circuits 9100 and 9200, when the bypass circuit B is configured using electrical elements that satisfy the formula (2), a noise with a frequency equal to the switching frequency fsw can be reduced. However, noises with other frequencies cannot be reduced sufficiently.

Based on the above knowledge, the present inventors have devised configurations disclosed herein.

Solving the Problem

A power circuit according to one aspect of the present disclosure includes a first input terminal (3a); a second input terminal (3b); a first reactor (Lr1); a second reactor (Lr2); a first switching element (Sw1); a second switching element (Sw2); a third switching element (S1); a fourth switching element (S2); a first capacitor (C1); a first output terminal (5a); a second output terminal (5b); a control circuit (9); a first inductor (Lc1); a second inductor (Lp1); and a bypass capacitor (01). In the power circuit, the first input terminal (3a) is connected to a first end of the second inductor (Lp1), a second end of the second inductor (Lp1) is connected to a first end of the first reactor (Lr1), a second end of the first reactor (Lr1) is connected to a first end of the third switching element (S1), and a second end of the third switching element (S1) is connected to the first output terminal (5a), the second end of the second inductor (Lp1) is connected to a first end of the second reactor (Lr2), a second end of the second reactor (Lr2) is connected to a first end of the fourth switching element (S2), and a second end of the fourth switching element (S2) is connected to the first output terminal (5a), the second input terminal (3b) is connected to the second output terminal (5b), a first end of the first switching element (Sw1) is connected to the second end of the first reactor (Lr1), and a second end of the first switching element (Sw1) is connected to the second output terminal (5b), a first end of the second switching element (Sw2) is connected to the second end of the second reactor (Lr2), and a second end of the second switching element (Sw2) is connected to the second output terminal (5b), a first end of the first capacitor (C1) is connected to the first output terminal (5a), and a second end of the first capacitor (C1) is connected to the second output terminal (5b), the first input terminal (3a) is connected to a first end of the first inductor (Lc1), a second end of the first inductor (Lc1) is connected to a first end of the bypass capacitor (CH), and a second end of the bypass capacitor (CH) is connected to the second output terminal (5b), the first inductor (Lc1) and the second inductor (Lp1) are magnetically coupled to each other, and the control circuit (9) performs switching control over the first switching element (Sw1) and the second switching element (Sw2), using an interleaving method.

In the above aspect, the power circuit may further include a bypass inductor (Le1), in which the bypass inductor (Le1) may be disposed between the second end of the first inductor (Lc1) and the first end of the bypass capacitor (Cb1).

In each of the aspects of the present disclosure described above, the power circuit may further include a current sensor (91). The current sensor (91) may detect a sum of a current value for a current flowing from the first end of the first inductor (Lc1) to the first input terminal (3a) and a current value for a current flowing from the first end of the second inductor (Lp1) to the first input terminal (3a). The control circuit (9) may adjust a switching frequency (fsw) and a duty ratio of each of the first switching element (Sw1) and the second switching element (Sw2) in such a way as to minimize the sum detected by the current sensor (91).

In the above aspect, the power circuit may further include a bypass inductor (Le1), and the bypass inductor (Le1) may be disposed between the first input terminal (3a) and the first end of the first inductor (Lc1).

In the above aspect, the power circuit may further include a bypass inductor (Le1), and the bypass inductor (Le1) may be disposed between the first input terminal (3a) and the first end of the second inductor (Lp1).

Each of embodiments described below is a specific example of the present disclosure. Numerical values, shapes, constituent elements, and the like are described in the following embodiments as examples, and are not intended for limiting the present disclosure. Among constituent elements included in the following embodiments, constituent elements not described in independent claims expressing the most superior concepts of the present disclosure will be described as optional constituent elements. Respective contents of all the embodiments may be combined with each other.

First Embodiment

Figure 1:
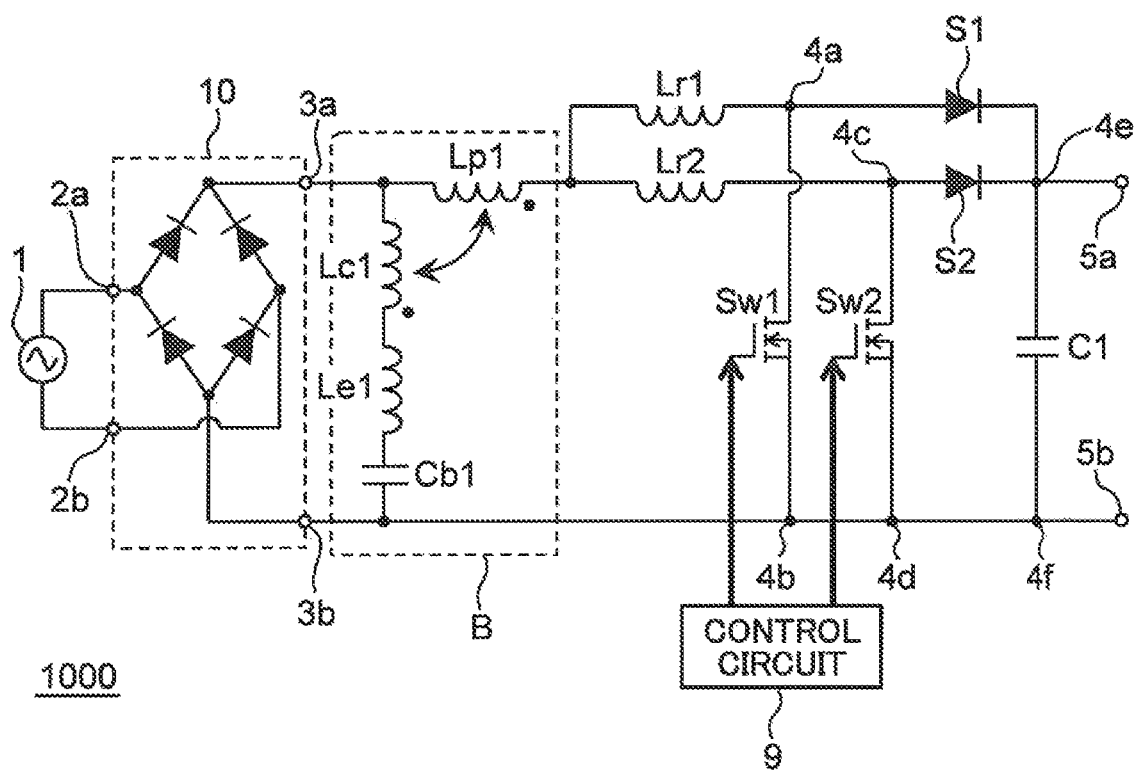
FIG. 1 is a circuit diagram showing a schematic configuration of a power circuit according to a first embodiment.

A first embodiment of the present disclosure will hereinafter be described. The same constituent elements as described above will be denoted by the same reference signs, and redundant description will be omitted as necessary. FIG. 1 is a circuit diagram showing a schematic configuration of a power factor improving circuit 1000 according to the first embodiment.

As shown in FIG. 1, the power factor improving circuit 1000 (an example of the power circuit) includes a first input terminal 3a, a second input terminal 3b, a first reactor Lr1, a second reactor Lr2, a first switching element Sw1, a second switching element Sw2, a third switching element S1, a fourth switching element S2, a first capacitor C1, a first output terminal 5a, a second output terminal 5b, a control circuit 9, and a bypass circuit B. The bypass circuit B has a first inductor Lc1, a second inductor Lp1, a bypass inductor Le1, and a bypass capacitor Cb1.

According to the power factor improving circuit 1000, the first input terminal 3a is connected to a first end of the second inductor Lp1. A second end of the second inductor Lp1 is connected to a first end of the first reactor Lr1. A second end of the first reactor Lr1 is connected to a first end of the third switching element S1. A second end of the third switching element S1 is connected to the first output terminal 5a.

The second end of the second inductor Lp1 is connected to a first end of the second reactor Lr2. A second end of the second reactor Lr2 is connected to a first end of the fourth switching element S2. A second end of the fourth switching element S2 is connected to a connection point 4e on a path linking the second end of the third switching element S1 to the first output terminal 5a. As a result, the second end of the fourth switching element S2 is connected to the first output terminal 5a.

The third switching element S1 and the fourth switching element S2 are each configured by, for example, a diode. The configuration of the third switching element S1 and of the fourth switching element S2 is, however, not limited to this. The third switching element S1 and the fourth switching element S2 may be each configured by a generally known switching element, such as a transistor (e.g., MOSFET or IGBT).

According to the power factor improving circuit 1000, the second input terminal 3b is connected to the second output terminal 5b.

A first end of the first switching element Sw1 is connected to a connection point 4a on a path linking the second end of the first reactor Lr1 to the first end of the third switching element S1. As a result, the first end of the first switching element Sw1 is connected to the second end of the first reactor Lr1. A second end of the first switching element Sw1 is connected to a connection point 4b on a path linking the second input terminal 3b to the second output terminal 5b. As a result, the second end of the first switching element Sw1 is connected to the second output terminal 5b.

A first end of the second switching element Sw2 is connected to a connection point 4c on a path linking the second end of the second reactor Lr2 to the first end of the fourth switching element S2. As a result, the first end of the second switching element Sw2 is connected to the second end of the second reactor Lr2. A second end of the second switching element Sw2 is connected to a connection point 4d on the path linking the second input terminal 3b to the second output terminal 5b. As a result, the second end of the second switching element Sw2 is connected to the second output terminal 5b.

The first switching element Sw1 and the second switching element Sw2 are each configured by, for example, a generally known switching element, such as a transistor (e.g., MOSFET or IGBT).

A first end of the first capacitor C1 is connected to the connection point 4e, while a second end of the first capacitor C1 is connected to a connection point 4f on the path linking the second input terminal 3b to the second output terminal 5b. As a result, the first end of the first capacitor C1 is connected to the first output terminal 5a, while the second end of the first capacitor C1 is connected to the second output terminal 5b.

The first input terminal 3a is connected to a first end of the first inductor Lc1. A second end of the first inductor Lc1 is connected to a first end of the bypass inductor Le1. A second end of the bypass inductor Le1 is connected to a first end of the bypass capacitor Cb1. In other words, the bypass inductor Le1 is disposed between the second end of the first inductor Lc1 and the first end of the bypass capacitor Cb1. Hence the second end of the first inductor Lc1 is connected to the first end of the bypass capacitor Cb1 via the bypass inductor Le1. A second end of the bypass capacitor Cb1 is connected to the second output terminal 5b.

The first inductor Lc1 and the second inductor Lp1 are magnetically coupled such that the second end of the first inductor Le1 and the second end of the second inductor Lp1 have the same polarity.

The control circuit 9 performs switching control over the first switching element Sw1 and the second switching element Sw2, using the interleaving method. As a result, the first switching element Sw1, the second switching element Sw2, the third switching element S1, and the fourth switching element S2 carry out interleaving operations.

According to the configuration of the first embodiment, the first switching element Sw1 and the second switching element Sw2 are subjected to switching control by the control circuit 9 using the interleaving method. As a result, out of frequency components included in triangular-wave-shaped ripples generated by switching actions of the first switching element Sw1 and the second switching element Sw2, frequency components equal to odd multiples of the switching frequency fsw can be canceled out. Hence propagation of a normal mode noise with frequency components equal to odd multiples of the switching frequency fsw to the AC power supply 1 or the like via the first input terminal 3a and the second input terminal 3b can be suppressed.

The first inductor Lc1 and the second inductor Lp1 are magnetically coupled to each other, and the second end of the second inductor Lp1 is connected to the first end of the first reactor Lr1. Because of this layout, a current flowing through the second inductor Lp1 excites a voltage across both terminals of the bypass capacitor Cb1, thus causing the voltage to oscillate. As a result, a ripple component with a predetermined frequency included in the current flowing through the second inductor Lp1 is supplied from the bypass capacitor Cb1. As a result, the ripple component with the predetermined frequency included in the current flowing through the second inductor Lp1 can be canceled out.

In this manner, according to the configuration of the first embodiment, not only the ripple components with frequencies equal to odd multiples of the switching frequency fsw but also, for example, a ripple component with a frequency two times the switching frequency fsw, both ripple components flowing out via the first input terminal 3a and the second input terminal 3b as a normal mode noise, can be reduced. Thus, compared with the power factor improving circuit 9000 (FIG. 6) that performs switching control using the conventional interleaving method, normal mode noises can be further reduced.

The frequency of a ripple component to be canceled out can be adjusted properly depending on constants of electrical elements included in the bypass circuit B. For example, a case is assumed where a ripple component with the frequency 2fsw, which is two times the switching frequency fsw, is canceled out. In this case, a current component flowing through the bypass capacitor Cb1, the current component having the frequency 2fsw, needs to match a current component flowing through the second inductor Lp1, the current component having the frequency 2fsw. Specifically, the following formula (1) needs to be satisfied.

[Mathematical Formula 2]

$$2f_{sw} = \frac{1}{2\pi\sqrt{C_b(L_c + L_e - k\sqrt{L_p L_c})}} \quad (1)$$

In the formula (1), the left side expresses the frequency of the ripple component to be canceled out. In this specific example, the frequency of the ripple component to be canceled out is the frequency 2fsw that is two times the switching frequency fsw. Cb denotes the capacitance of the bypass capacitor Cb1. Lp denotes the inductance of the second inductor Lp1. Lc denotes the inductance of the first inductor Lc1. Le denotes the inductance of the bypass inductor Le1. Also, k denotes a coupling factor for the magnetic coupling between the second inductor Lp1 and the first inductor Lc1.

Thus, when the bypass circuit B is configured using electrical elements that satisfy the formula (1), the power factor improving circuit 1000 (which will hereinafter be referred to as "the power factor improving circuit 1000 that satisfies the formula (1)") can reduce ripple components with frequencies equal to odd multiples of the switching frequency fsw and a ripple component with a frequency two times the switching frequency fsw.

Figure 2:
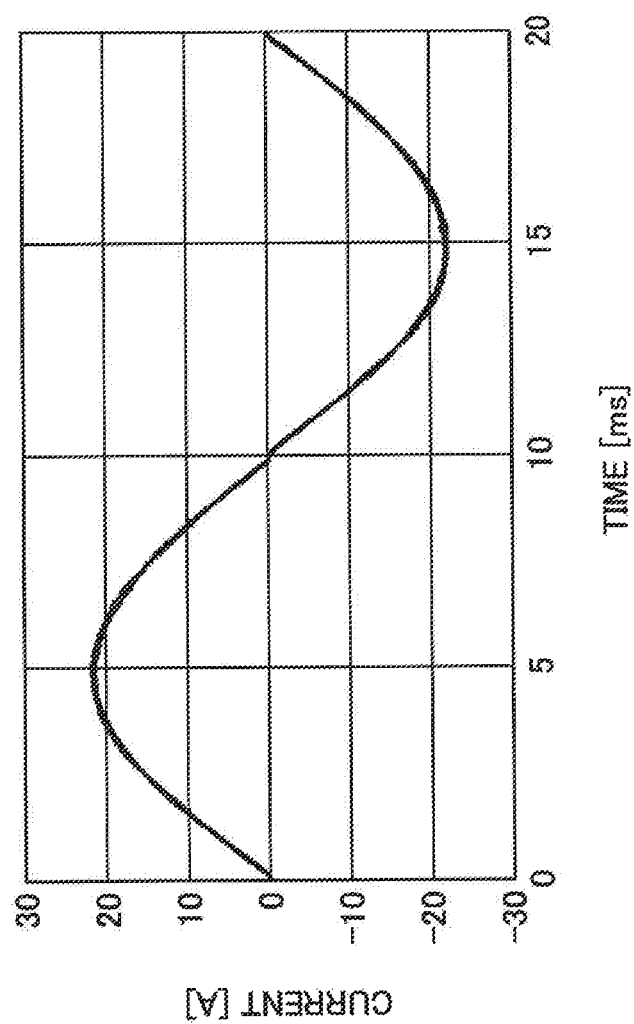
FIG. 2 is a graph showing a calculation result obtained by a circuit simulation of a power current in a power factor improving circuit that satisfies a formula (1).

FIG. 2 shows a calculation result obtained by a circuit simulation of a power current in the power factor improving circuit 1000 that satisfies the formula (1). A segment of a power current waveform shown in FIG. 2, the segment in a period from time 5 ms to time 5.1 ms, is extracted and shown in an enlarged form in FIG. 3.

In this circuit simulation, similarly to the circuit simulation of the power factor improving circuit 9000 (FIG. 6) in the comparative example described above, the inductance Lr of the first reactor Lr1 and of the second reactor Lr2 is determined to be 200 uH, and the switching frequency fsw is determined to be 100 kHz. The frequency and the effective value of an AC voltage supplied from the AC power supply 1 are determined to be 50 Hz and 200 V, respectively. The DC voltage that develops between the first output terminal 5a and the second output terminal 5b is determined to be 400 V.

To satisfy the formula (1), the capacitance Cb of the bypass capacitor Cb1 is determined to be 400 nF. The inductance Lp of the second inductor Lp1 is determined to be 1 µH. The inductance Lc of the first inductor Lc1 is determined to be 1 µH. The inductance Le of the bypass inductor Le1 is determined to be 1.5 µH. The coupling factor k for the magnetic coupling between the second inductor Lp1 and the first inductor Lc1 is determined to be 0.95.

Figure 3:
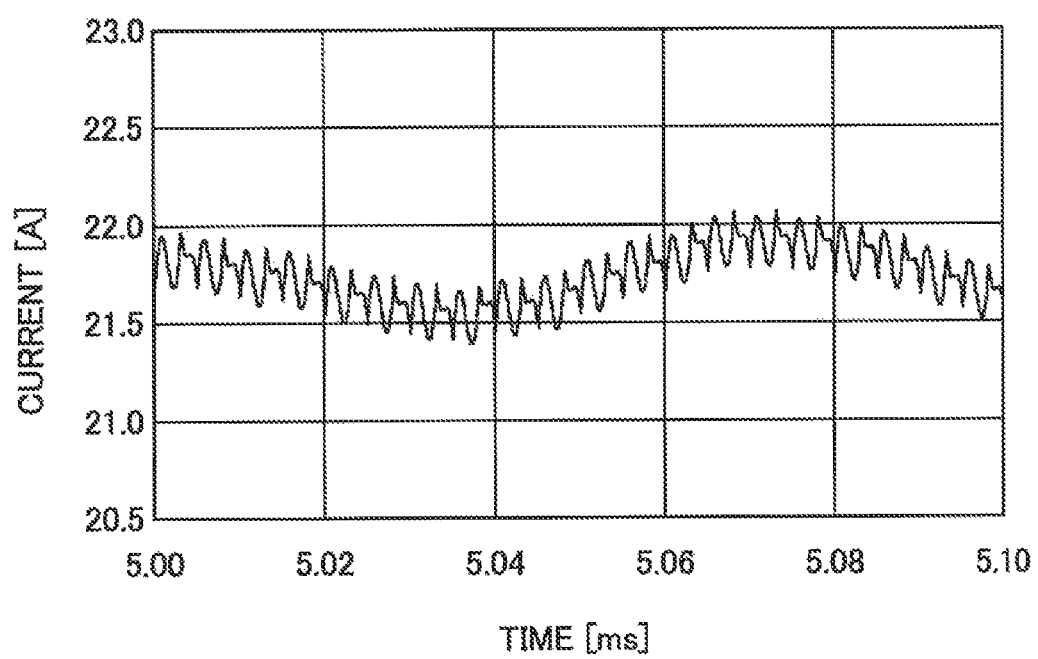
FIG. 3 is a graph showing an enlarged view of a segment of a power current waveform shown in FIG. 2, the segment being in a specific period.

The power factor improving circuit 1000 that satisfies the formula (1) can reduce ripple components with frequencies equal to one time and two times the switching frequency fsw and to odd multiples of the switching frequency fsw, i.e., three times or more the switching frequency fsw. In other words, the power factor improving circuit 1000 can reduce a ripple component with a frequency two times the switching frequency fsw, the ripple component being hardly reduced by an X capacitor because of its small capacitance, more effectively than the above power factor improving circuit 9000 (FIG. 6) in the comparative example. As a result, as shown in FIG. 2, the power current waveform generated by the power factor improving circuit 1000 has less noise components superimposed on the waveform than the power current waveform shown in FIG. 7 that is generated by the power factor improving circuit 9000 (FIG. 6). In addition, as shown in FIG. 3, as a result of effective reduction in the ripple component with the frequency two times the switching frequency fsw, the power current waveform generated by the power factor improving circuit 1000 has an amplitude smaller than that of the power current waveform shown in FIG. 7 that is generated by the power factor improving circuit 9000 (FIG. 6).

The configuration of the first embodiment is more advantageous in the following respects than a configuration in which, for example, a first modified bypass circuit and a second modified bypass circuit, which will be described below, are connected in parallel to each other (this configuration will hereinafter be referred to as "comparative configuration").

The first modified bypass circuit is a circuit created by removing the second inductor Lp1 from the bypass circuit B and magnetically coupling the first inductor Lc1, which is in the bypass circuit B, to the first reactor Lr1 such that the second end of the first inductor Lc1 and the second end of the first reactor Lr1 have the same polarity.

Likewise, the second modified bypass circuit is a circuit created by removing the second inductor Lp1 from the bypass circuit B and magnetically coupling the first inductor Lc1 to the second reactor Lr2 such that the second end of the first inductor Lc1 and the second end of the second reactor Lr2 have the same polarity.

In the comparative configuration, one inductor of the first modified bypass circuit and one inductor of the second modified bypass circuit, that is, two inductors of the first and second modified bypass circuits need to be magnetically coupled respectively to the reactors. In the configuration of the first embodiment, in contrast, two inductors are magnetically coupled in the single bypass circuit B. In other words, in the configuration of the first embodiment, unbalanced magnetic coupling is more unlikely to happen as compared to the comparative configuration. Therefore, the configuration of the first embodiment is more advantageous than the comparative configuration in that the power factor improving circuit can be achieved using inexpensive inductors of which constant variations are larger than constant variations of inductors used in the comparative configuration.

Because the first modified bypass circuit and the second modified bypass circuit are connected in parallel with each other in the comparative configuration, a current path in which a current leaves the first input terminal 3a, flows through the first modified bypass circuit and the second modified bypass circuit, and returns to the first input terminal 3a is formed in the comparative configuration.

In the configuration of the first embodiment, in contrast, the first input terminal 3a is connected to the first end of the inductor Lc1, the first end being one end of the bypass circuit B, and the second input terminal 3b is connected to the second end of the bypass capacitor Cb1, the second end being another end of the bypass circuit B. In addition, in the bypass circuit B, the first inductor Lc1, the bypass inductor Le1, and the bypass capacitor Cb1 are connected in series.

Because of this layout, a current path through which a current leaves the first input terminal 3a, flows through the bypass circuit B, to return to the first input terminal 3a is not formed. This prevents a case where a resonance current with a large current value flows through each of the elements included in the bypass circuit. As a result, out of the electrical elements constituting the bypass circuit B, the first inductor Lc1, the bypass inductor Le1, and the bypass capacitor Cb1, which need not be arranged on a power current supply path linking the first input terminal 3a to the first output terminal 5a, can be provided as small-sized components with small current ratings.

According to the configuration of the first embodiment, even if the coupling factor for the magnetic coupling between the second inductor Lp1 and the first inductor Le1 is close to 1, a coupling factor for magnetic coupling between the second inductor Lp1 and a combined inductor created by combining the first inductor Lc1 with the bypass inductor Le1 is considered to be small from the viewpoint of equivalency between both coupling factors. For this reason, a desired coupling factor can be obtained easily by adjusting the inductance of the bypass inductor Le1, without changing the shape of a core used for the magnetic coupling between the second inductor Lp1 and the first inductor Lc1.

Using a large core having branch magnetic paths, such as an EI core and an EE core, to obtain a desired coupling factor, therefore, can be avoided. Hence the power factor improving circuit can be miniaturized.

First Modification of First Embodiment

Figure 4:
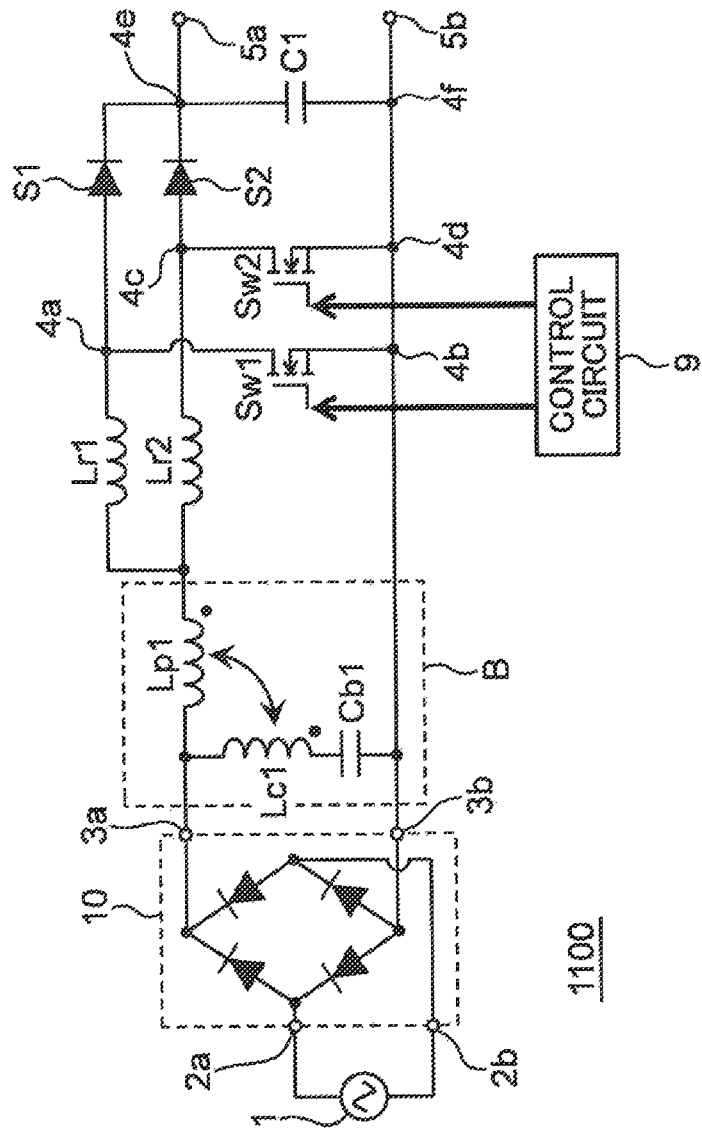
FIG. 4 is a circuit diagram showing a schematic configuration of a power factor improving circuit in a first modification of the first embodiment.

A first modification of the first embodiment will hereinafter be described. Description overlapping the above description will be omitted as necessary. FIG. 4 is a circuit diagram showing a schematic configuration of a power factor improving circuit 1100 in the first modification of the first embodiment.

As shown in FIG. 4, the power factor improving circuit 1100 is different from the power factor improving circuit 1000 (FIG. 1) in that the power factor improving circuit 1100 does not include the bypass inductor Le1.

This configuration, similarly to the configuration of the first embodiment, reduces triangular-wave-shaped ripples including ripple components with frequencies equal to odd multiples of the switching frequency fsw and a ripple component with a predetermined frequency, both ripple components flowing out toward the AC power supply 1 side as a normal mode noise.

Second Modification of First Embodiment

Figure 5:
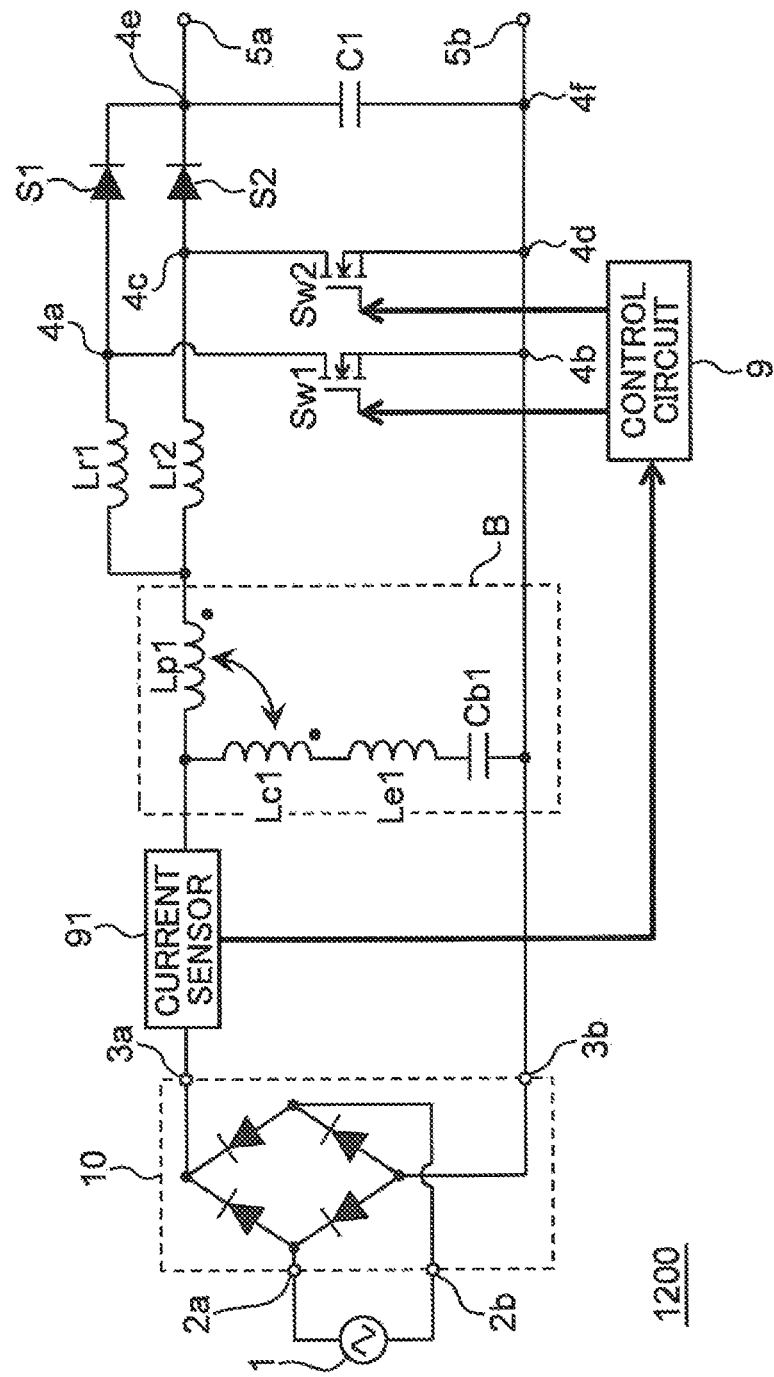
FIG. 5 is a circuit diagram showing a schematic configuration of a power factor improving circuit in a second modification of the first embodiment.

A second modification of the first embodiment will hereinafter be described. Description overlapping the above description will be omitted as necessary. FIG. 5 is a circuit diagram showing a schematic configuration of a power factor improving circuit 1200 in the second modification of the first embodiment.

As shown in FIG. 5, the power factor improving circuit 1200 is different from the power factor improving circuit 1000 (FIG. 1) in that the power factor improving circuit 1200 further includes a current sensor 91.

The current sensor 91 detects the sum of a current value for a current flowing from the first end of the first inductor Lc1 to the first input terminal 3a and a current value for a current flowing from the first end of the second inductor Lp1 to the first input terminal 3a. The current sensor 91 outputs the detected sum to the control circuit 9.

The control circuit 9 adjusts the switching frequency fsw and the duty ratio of each of the first switching element Sw1 and the second switching element Sw2 in such a way as to minimize predetermined frequency components included in the sum detected by the current sensor 91. The switching frequency fsw and the duty ratio may be adjusted properly by a known method.

A predetermined frequency may be determined to be a frequency expressed as the product of the switching frequency fsw and the number of switching elements subjected to switching control by the control circuit 9 using the interleaving method. For example, in this modification, the control circuit 9 performs switching control over two switching elements, i.e., the first switching element Sw1 and the second switching element Sw2, using the interleaving method. The predetermined frequency is thus determined to be the frequency 2fsw, which is two times the switching frequency fsw. In this case, the control circuit 9 adjusts the switching frequency fsw and the duty ratio of each of the first switching element Sw1 and the second switching element Sw2 in such a way as to minimize each of frequency components included in the sum detected by the current sensor 91, the frequency components each being two times the switching frequency fsw.

According to this configuration, the current sensor 91 detects the sum of the current values for currents flowing from the first end of the first inductor Lc1 and the first end of the second inductor Lp1, respectively, to the first input terminal 3a. In other words, a current value for a noise current that has not been reduced through the bypass circuit B, the noise current being included in a noise current flowing from the first end of the second inductor Lp1 to the first input terminal 3a, is detected as the above sum. To minimize the predetermined frequency components included in the detected sum, the control circuit 9 adjusts the switching frequency fsw and the duty ratio of each of the first switching element Sw1 and the second switching element Sw2.

Therefore, even if constants of electrical elements constituting the power factor improving circuit vary to provide the bypass circuit B configured to be incapable of sufficiently reducing a noise current, the above adjustment by the control circuit 9 can minimize the noise current.

The power factor improving circuit 1100 (FIG. 4) may further include the current sensor 91, similarly to the power factor improving circuit 1200. In the power factor improving circuit 1100, the control circuit 9 may adjust the switching frequency fsw and the duty ratio of each of the first switching element Sw1 and the second switching element Sw2 in such a way as to minimize the sum detected by the current sensor 91.

The current sensor 91 may be connected in series to the bypass capacitor Cb1. In this case, the control circuit 9 adjusts the switching frequency fsw and the duty ratio of each of the first switching element Sw1 and the second switching element Sw2 in such a way as to maximize the predetermined frequency components included in the sum detected by the current sensor 91.

The current sensor 91 may be connected in series to the first switching element Sw1, and a current sensor different from the current sensor 91 may be connected in series to the second switching element Sw2. In this case, the control circuit 9 adjusts the switching frequency fsw and the duty ratio of each of the first switching element Sw1 and the second switching element Sw2 such that predetermined frequency components included in current values detected by the above two current sensors become equal with each other.

Third Modification of First Embodiment

Figure 11:
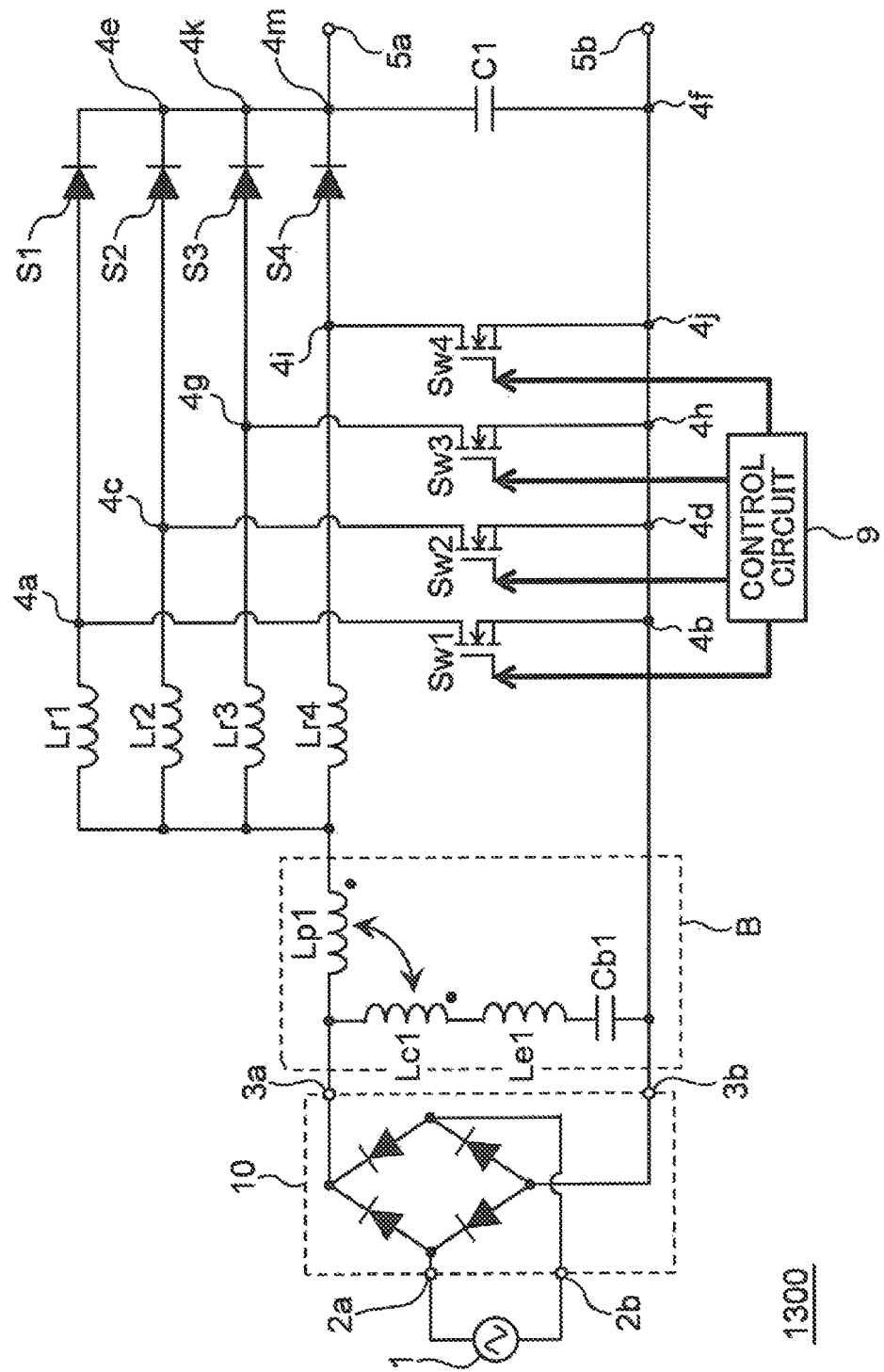
FIG. 11 is a circuit diagram showing a schematic configuration of a power factor improving circuit in a third modification of the first embodiment.

A third modification of the first embodiment will hereinafter be described. Description overlapping the above description will be omitted as necessary. FIG. 11 is a circuit diagram showing a schematic configuration of a power factor improving circuit 1300 in a third modification of the first embodiment.

The power factor improving circuit 1000 (FIG. 1) according to the first embodiment is configured such that the control circuit 9 performs switching control over two switching elements Sw1 and Sw2, using a so-called two-phase interleaving method of causing the switching elements Sw1 and Sw2 to be switched on and off at the same switching frequency fsw but at respective phases different by 180 degrees (=360 degrees/2) from each other. However, as shown in FIG. 11, the power factor improving circuit 1300 is different from the power factor improving circuit 1000 (FIG. 1) in that the control circuit 9 performs switching control over four switching elements Sw1, Sw2, Sw3, and Sw4, using a so-called four-phase interleaving method of causing the switching elements Sw1, Sw2, Sw3, and Sw4 to be switched on and off at the same switching frequency fsw but at respective phases different by 90 degrees (=360 degrees/4) from each other.

Specifically, in addition to the constituent elements of the power factor improving circuit 1000 (FIG. 1), the power factor improving circuit 1300 further includes two reactors Lr3 and Lr4 each similar to the second reactor Lr2, two switching elements Sw3 and Sw4 each similar to the second switching element Sw2, and two switching elements S3 and S4 each similar to the fourth switching element S2.

In other words, the second end of the second inductor Lp1 is connected to a first end of the reactor Lr3. A second end of the reactor Lr3 is connected to a first end of the switching element S3. A second end of the switching element S3 is connected to a connection point 4k on a path linking the second end of the third switching element S1 to the first output terminal 5a. As a result, the second end of the switching element S3 is connected to the first output terminal 5a.

The second end of the second inductor Lp1 is connected to a first end of the reactor Lr4. A second end of the reactor Lr4 is connected to a first end of the switching element S4. A second end of the switching element S4 is connected to a connection point 4m on the path linking the second end of the third switching element S1 to the first output terminal 5a. As a result, the second end of the switching element S4 is connected to the first output terminal 5a.

The switching element S3 and the switching element S4 are each configured by, for example, a diode. The configuration of the switching element S3 and the switching element S4 is, however, not limited to this. They may be each configured by a generally known switching element, such as a transistor (e.g., MOSFET or IGBT).

A first end of the switching element Sw3 is connected to a connection point 4g on a path linking the second end of the reactor Lr3 to the first end of the switching element S3. As a result, the first end of the switching element Sw3 is connected to the second end of the reactor Lr3. A second end of the switching element Sw3 is connected to a connection point 4h on the path linking the second input terminal 3b to the second output terminal 5b. As a result, the second end of the switching element Sw3 is connected to the second output terminal 5b.

A first end of the switching element Sw4 is connected to a connection point 4i on a path linking the second end of the reactor Lr4 to the first end of the switching element S4. As a result, the first end of the switching element Sw4 is connected to the second end of the reactor Lr4. A second end of the switching element Sw4 is connected to a connection point 4j on the path linking the second input terminal 3b to the second output terminal 5b. As a result, the second end of the switching element Sw4 is connected to the second output terminal 5b.

The switching element Sw3 and the switching element Sw4 are each configured by, for example, a generally known switching element, such as a transistor (e.g., MOSFET or IGBT).

The control circuit 9 performs switching control over the first switching element Sw1 and the second switching element Sw2 and over the two switching elements Sw3 and Sw4 similar to the first and second switching elements Sw1 and Sw2, using the so-called four-phase interleaving method. Specifically, the control circuit 9 performs the switching control in such a way as to cause these four switching elements Sw1, Sw2, Sw3, and Sw4 to be switched on and off at the same switching frequency fsw but at respective phases different by 90 degrees from each other. The switching element S3 is switched off when the switching element Sw3 is switched on, and is switched on when the switching element Sw3 is switched off. The switching element S4 is switched off when the switching element Sw4 is switched on, and is switched on when the switching element Sw4 is switched off.

According to the configuration of the third modification of the first embodiment, the control circuit 9 causes the four switching elements Sw1, Sw2, Sw3, and Sw4 to be switched on and off at respective phases different by 90 degrees from each other. As a result, out of frequency components included in triangular-wave-shaped ripples generated by switching actions of the four switching elements Sw1, Sw2, Sw3, and Sw4, frequency components equal to odd multiples of the switching frequency fsw and frequency components equal to two times odd multiples of (two times (2×1), six times (2×3), ten times (2×5) . . . ) the switching frequency fsw can be canceled out. Hence not only a normal mode noise with frequency components equal to odd multiples of the switching frequency fsw but also a normal mode noise with frequency components equal to two times odd multiples of the switching frequency fsw can be suppressed from propagating to the AC power supply 1 or the like via the first input terminal 3a and the second input terminal 3b.

Similarly to the power factor improving circuit 1000 (FIG. 1) according to the first embodiment, the first inductor Lc1 and the second inductor Lp1 are magnetically coupled to each other, and the second end of the second inductor Lp1 is connected to the first end of the first reactor Lr1. As a result, a ripple component with a predetermined frequency included in a current flowing through the second inductor Lp1 can be canceled out.

Thus, not only the frequency components equal to odd multiples of the switching frequency fsw and frequency components equal to two times odd multiples of the switching frequency fsw, for example, but also ripple components with frequencies four times the switching frequency fsw, the frequency components and ripple components flowing out via the first input terminal 3a and the second input terminal 3b as a normal mode noise, can be reduced. Compared to the power factor improving circuit 1000 (FIG. 1), therefore, normal mode noises can be further reduced.

In the same manner as described above, a power factor improving circuit may further include, in addition to the constituent elements of the power factor improving circuit 1000 (FIG. 1), six reactors each similar to the second reactor Lr2, six switching elements each similar to the second switching element Sw2, and six switching elements each similar to the fourth switching element S2. In this power factor improving circuit, the control circuit 9 performs switching control over eight switching elements, using a so-called eight-phase interleaving method.

In this manner, a power factor improving circuit may include n-th power of 2 switching elements (n is an integer of 1 or more) similar to the first switching element Sw1 and the second switching element Sw2. In this power factor improving circuit, the control circuit 9 performs switching control over n-th power of 2 switching elements, using a so-called n-th power of 2-phase interleaving method of causing the n-th power of 2 switching elements to be switched on and off at respective phases different by 360 for n-th power of 2 (360/n-th power of 2) degrees from each other.

This power factor improving circuit suppresses propagation of normal mode noises with frequency components equal to odd multiples of the switching frequency fsw and with frequency components equal to n-th power of 2 times odd multiples of the switching frequency fsw to the AC power supply 1 or the like via the first input terminal 3a and the second input terminal 3b. According to the power factor improving circuit, the bypass circuit B cancels out a ripple component with a predetermined frequency (e.g., a frequency n-th power of 2 times the switching frequency fsw) included in a current flowing through the second inductor Lp1.

Even if the power factor improving circuit carries out switching control as switching control using a multiphase interleaving method, the power factor improving circuit is configured to have the single bypass circuit B without providing bypass circuits B corresponding respectively to multiple phases. The power factor improving circuit thus maintains its compactness in size.

The power factor improving circuit may further include the current sensor 91, similarly to the power factor improving circuit 1200 (FIG. 5), and may cause the control circuit 9 to adjust the switching frequency fsw and the duty ratio of each of n-th power of 2 switching elements in such a way as to minimize predetermined frequency components included in the sum detected by the current sensor 91.

In this case, a predetermined frequency may be determined to be a frequency expressed as the product of the switching frequency fsw and n-th power of 2 that is the number of switching elements subjected to switching control by the control circuit 9 using the interleaving method. In this case, the control circuit 9 adjusts the switching frequency fsw and the duty ratio of each of the n-th power of 2 switching elements in such a way as to minimize each of frequency components equal to n-th power of 2 times the switching frequency fsw, the frequency components being included in the sum detected by the current sensor 91.

The current sensor 91 may be connected in series to the bypass capacitor Cb1. In this case, the control circuit 9 adjusts the switching frequency fsw and the duty ratio of each of the n-th power of 2 switching elements in such a way as to maximize predetermined frequency components included in a current value detected by the current sensor 91.

Alternatively, n-th power of 2 current sensors each similar to the current sensor 91 may be connected respectively in series to n-th power of 2 switching elements. In this case, the control circuit 9 adjusts the switching frequency fsw and the duty ratio of each of the n-th power of 2 switching elements such that predetermined frequency components included in current values detected by the n-th power of 2 current sensors become equal with each other.

Fourth Modification of First Embodiment

Figure 12:
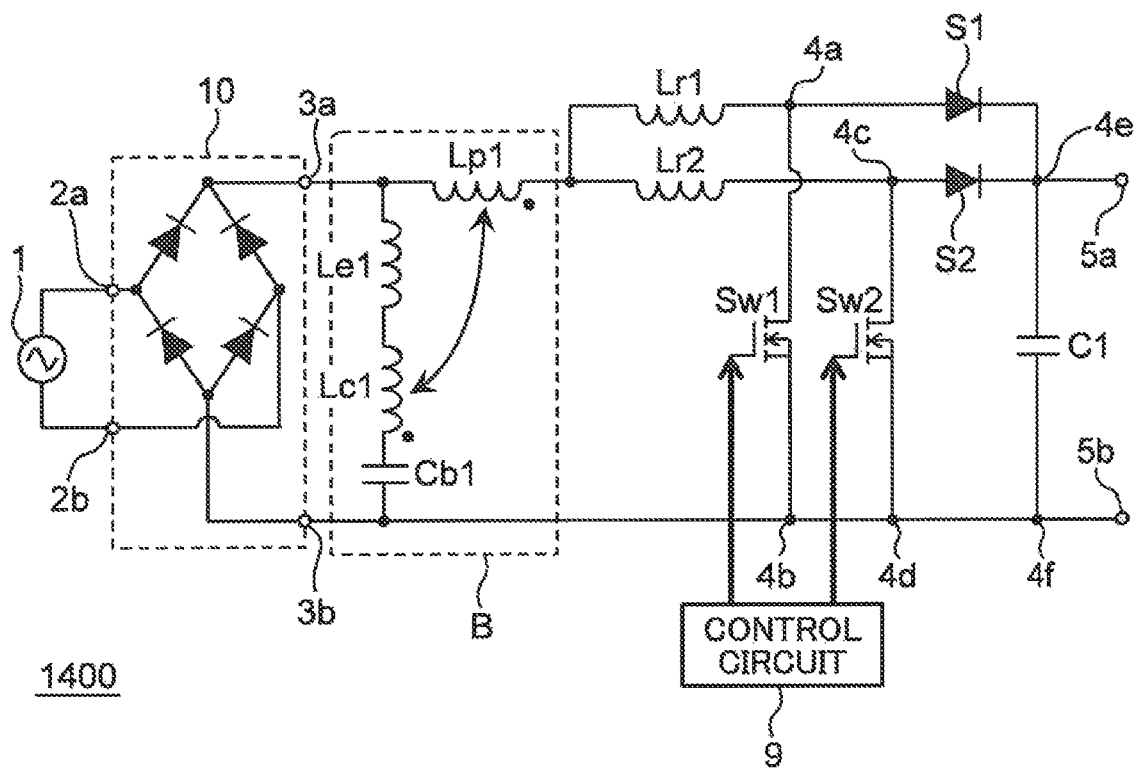
FIG. 12 is a circuit diagram showing a schematic configuration of a power factor improving circuit in a fourth modification of the first embodiment.

A fourth modification of the first embodiment will hereinafter be described. Description overlapping the above description will be omitted as necessary. FIG. 12 is a circuit diagram showing a schematic configuration of a power factor improving circuit 1400 in a fourth modification of the first embodiment. As shown FIG. 12, the power factor improving circuit 1400 is different from the power factor improving circuit 1000 (FIG. 1) in that the bypass inductor Le1 is disposed between the first input terminal 3a and the first end of the first inductor Lc1.

The configuration of the power factor improving circuit 1400, similarly to the configuration of the first embodiment, reduces ripple components with frequencies equal to odd multiples of the switching frequency fsw and a ripple component with a frequency two times the switching frequency fsw, both ripple components flowing out via the first input terminal 3a and the second input terminal 3b as a normal mode noise.

The power factor improving circuit 1300 (FIG. 11) and each of the power factor improving circuits provided as modifications of the power factor improving circuit 1300 (FIG. 11) may be modified to have the same configuration as the configuration of the power factor improving circuit 1400 in which the bypass inductor Le1 is disposed between the first input terminal 3a and the first end of the first inductor Lc1.

Fifth Modification of First Embodiment

Figure 13:
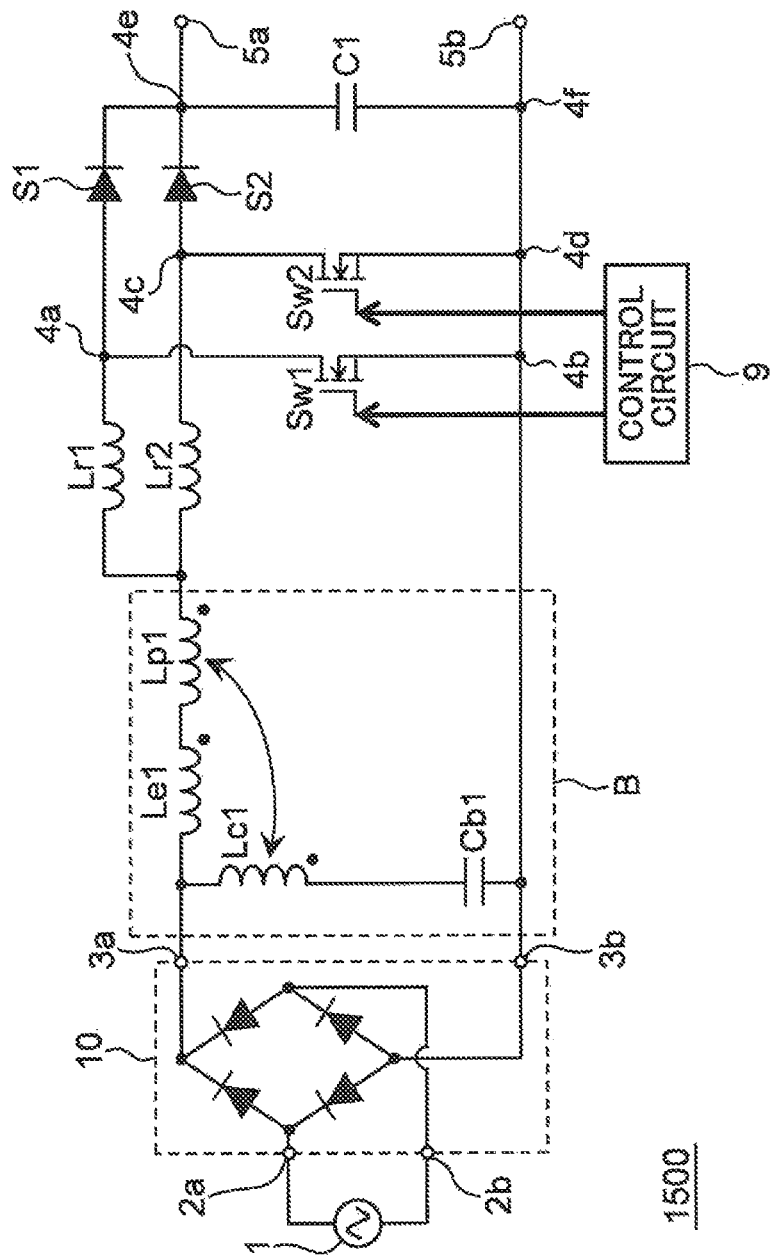
FIG. 13 is a circuit diagram showing a schematic configuration of a power factor improving circuit in a fifth modification of the first embodiment.

A fifth modification of the first embodiment will hereinafter be described. Description overlapping the above description will be omitted as necessary. FIG. 13 is a circuit diagram showing a schematic configuration of a power factor improving circuit 1500 in a fifth modification of the first embodiment. As shown FIG. 13, the power factor improving circuit 1500 is different from the power factor improving circuit 1000 (FIG. 1) and from the power factor improving circuit 1400 (FIG. 12) in that the bypass inductor Le1 is disposed between the first input terminal 3a and the first end of the second inductor Lp1.

The configuration of the power factor improving circuit 1500, similarly to the configuration of the first embodiment, reduces ripple components with frequencies equal to odd multiples of the switching frequency fsw and a ripple component with a frequency two times the switching frequency fsw, both ripple components flowing out via the first input terminal 3a and the second input terminal 3b as a normal mode noise.

The power factor improving circuit 1300 (FIG. 11) and each of the power factor improving circuits provided as modifications of the power factor improving circuit 1300 (FIG. 11) may be modified to have the same configuration as the configuration of the power factor improving circuit 1500 in which the bypass inductor Le1 is disposed between the first input terminal 3a and the first end of the second inductor Lp1.

The configurations of the above power factor improving circuits raise a concern that even if ripple components with frequencies n-th power of 2 times the switching frequency fsw are reduced by the bypass circuit B, ripple components with other frequencies different from frequencies equal to odd multiples of the switching frequency fsw and to n-th power of 2 times odd multiples of the switching frequency fsw may not be reduced sufficiently and, consequently, propagate as a normal mode noise to cause malfunctioning of peripheral circuits. To eliminate this concern, in the configurations of the first embodiment and the modifications thereof, the control circuit 9 may perform so-called frequency spread control to also reduce such ripple components with other frequencies.

In the above configurations, the rectifying section 10 is provided as a diode bridge circuit having four diodes. The configuration of the rectifying section 10 is, however, not limited to this. The rectifying section 10 may be provided as a bridgeless circuit or a totem pole circuit. In the above configurations, the AC power supply 1 and the rectifying section 10 may be replaced with a chopper circuit constructed by connecting a DC power supply to the first input terminal 3a and to the second input terminal 3b.

In the above embodiments, "connection between two elements" (e.g., connection of a certain element to a different element) may refer not only to direct physical connection but also to electrical connection and to connection between two elements across a different element interposed therebetween, the different element being, for example, a wiring line, a resistance element, or the like that does not impair the functions of the embodiments.

The invention claimed is:

1. A power supply circuit comprising:
   a first input terminal which is connected to an AC power supply via a rectifying section, the first input terminal directly connected to the rectifying section;
   a second input terminal which is connected to the AC power supply via the rectifying section, the second input terminal directly connected to the rectifying section;
   a first reactor;
   a second reactor;
   a first switching element;
   a second switching element;
   a third switching element;
   a fourth switching element;
   a first capacitor;
   a first output terminal;
   a second output terminal;
   a control circuit;
   a first inductor;
   a second inductor; and
   a bypass capacitor,
   wherein the first input terminal is connected to a first end of the second inductor,
   a second end of the second inductor is connected to a first end of the first reactor, a second end of the first reactor is connected to a first end of the third switching element, and a second end of the third switching element is connected to the first output terminal,
   the second end of the second inductor is connected to a first end of the second reactor, a second end of the second reactor is connected to a first end of the fourth switching element, and a second end of the fourth switching element is connected to the first output terminal,
   the second input terminal is connected to the second output terminal,
   a first end of the first switching element is connected to the second end of the first reactor, and a second end of the first switching element is connected to the second output terminal,
   a first end of the second switching element is connected to the second end of the second reactor, and a second end of the second switching element is connected to the second output terminal,
   a first end of the first capacitor is connected to the first output terminal, and a second end of the first capacitor is connected to the second output terminal,
   the first input terminal is connected to a first end of the first inductor, a second end of the first inductor is connected to a first end of the bypass capacitor, and a second end of the bypass capacitor is connected to the second output terminal,
   the first inductor and the second inductor are magnetically coupled to each other, and
   the control circuit performs switching control over the first switching element and the second switching element, using an interleaving method.

2. The power supply circuit according to claim 1, further comprising a bypass inductor,
   wherein the bypass inductor is disposed between the second end of the first inductor and the first end of the bypass capacitor.

3. The power supply circuit according to claim 1, further comprising a current sensor,
   wherein the current sensor detects a sum of a current value for a current flowing from the first end of the first inductor to the first input terminal and a current value for a current flowing from the first end of the second inductor to the first input terminal, and
   the control circuit adjusts a switching frequency and a duty ratio of each of the first switching element and the second switching element in such a way as to minimize a predetermined frequency component included in the sum detected by the current sensor.

4. The power supply circuit according to claim 1, further comprising a bypass inductor,
   wherein the bypass inductor is disposed between the first input terminal and the first end of the first inductor.

5. The power supply circuit according to claim 1, further comprising a bypass inductor,
   wherein the bypass inductor is disposed between the first input terminal and the first end of the second inductor.

* * * * *